April 28, 1936.　　　　L. JASPER　　　　2,039,006
APPARATUS FOR DISPENSING BEVERAGES
Filed April 2, 1935　　　2 Sheets-Sheet 1

INVENTOR.
LOUIS JASPER,
BY
ATTORNEY.

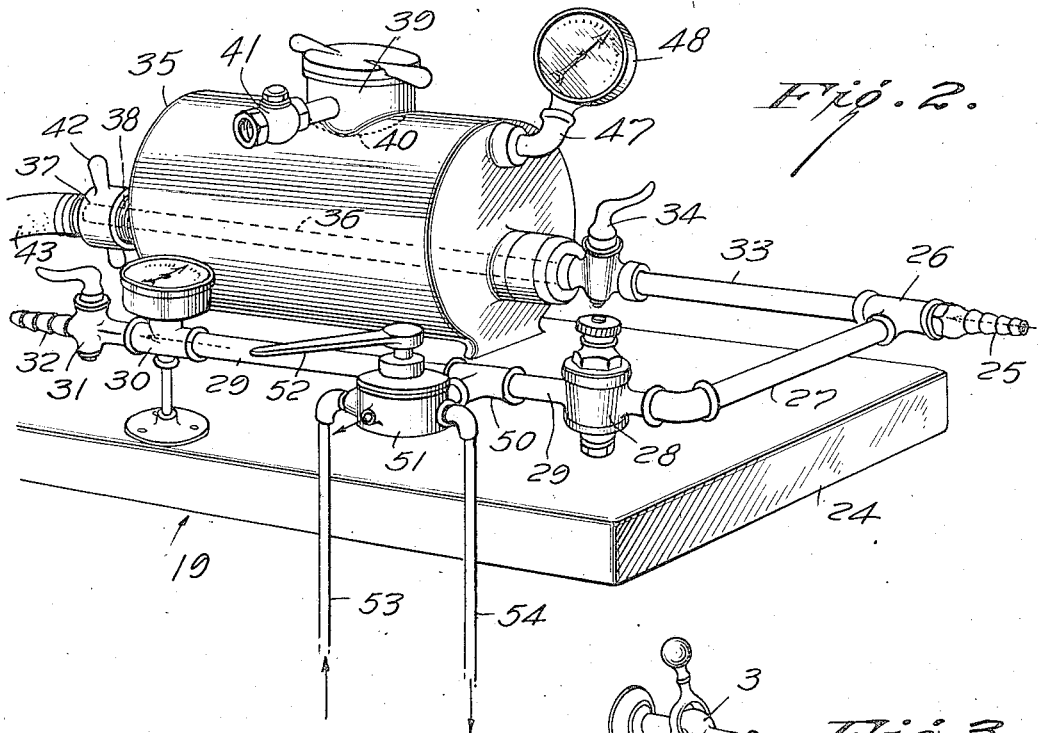
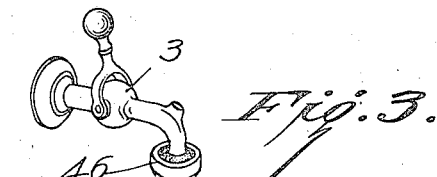
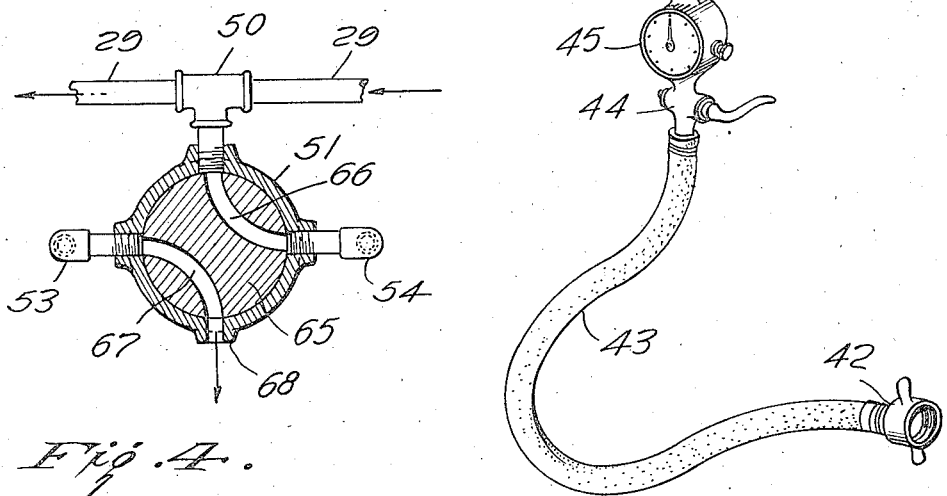

Patented Apr. 28, 1936

2,039,006

UNITED STATES PATENT OFFICE 2,039,006

APPARATUS FOR DISPENSING BEVERAGES

Louis Jasper, New York, N. Y., assignor of one-half to Max Apter, Brooklyn, N. Y.

Application April 2, 1935, Serial No. 14,199

6 Claims. (Cl. 225—12)

This invention relates to an apparatus for dispensing beverages such as beer, ale, or the like, under pressure of a gas. More particularly, the present invention is directed to an apparatus associated with the dispensing apparatus whereby various results having desirable effects may be obtained.

Dispensing apparatus for beer and the like generally consists of a source of gas pressure, which may be an air pump or a cylinder of compressed gas, such as carbon dioxide. Gas pressure is placed on a barrel or other container located usually in the basement of a building, with pipes leading therefrom to an upper floor where faucets are provided for the actual dispensing. The pressure of the gas is the force that moves the beer to the dispensing point and it also has the function of preventing loss of gas which is contained in or dissolved by the liquid.

If beer is not dispensed for several hours or over night there is a loss of gas in the beer or the like within the pipes. Therefore, on resuming operations it becomes necessary to waste all of the beer in the pipes which has become stale. This represents an unnecessary loss. Furthermore, because of the growth of yeast deposits in the pipes, an undesirable taste is imparted to the beer and therefore the pipes must be cleaned at frequent intervals. Such cleaning is a relatively expensive procedure.

The present invention is intended to overcome the disadvantages of the old system for dispensing beverages, it being among the objects thereof to provide a device which may be attached to or become part of said system, which is capable of preventing or eliminating the growth of yeast in the pipes, which will allow the ready cleaning thereof without disrupting the apparatus, and which is capable of saving the beverage within the pipes and preventing the same from becoming stale.

In practicing my invention I provide a unit which is adapted to be coupled to the dispensing apparatus. The unit is so constructed that it may be utilized to control the pressure on the barrels and thus control the rate of flow of the beverage from the faucets, and also to regulate the amount of gas therein. My apparatus may be coupled to the faucet and at the proper time, as when closing the apparatus for a number of hours, cause the beverage within the pipes to be forced into the barrel. My apparatus is also capable of preventing a large amount of gas from being forced into the barrel which would ordinarily result in churning up any sediment therein, which would impart an undesirable taste to the beverage. The present invention may also be used for cleaning the pipes and this may be accomplished by merely making a few temporary connections, without disrupting the dispensing apparatus and quickly and effectively cleaning the entire system.

The nature of my invention is illustrated in the accompanying drawings constituting a part hereof and in which Fig. 1 is an elevational view of a dispensing apparatus, showing the present invention in position for operation.

Fig. 2 is an enlarged perspective view of the device mounted as a unit.

Fig. 3 is a perspective view showing one of the means for connecting the device to the faucet, and Fig. 4 is a horizontal cross-sectional view of a control valve member.

Figure 1:
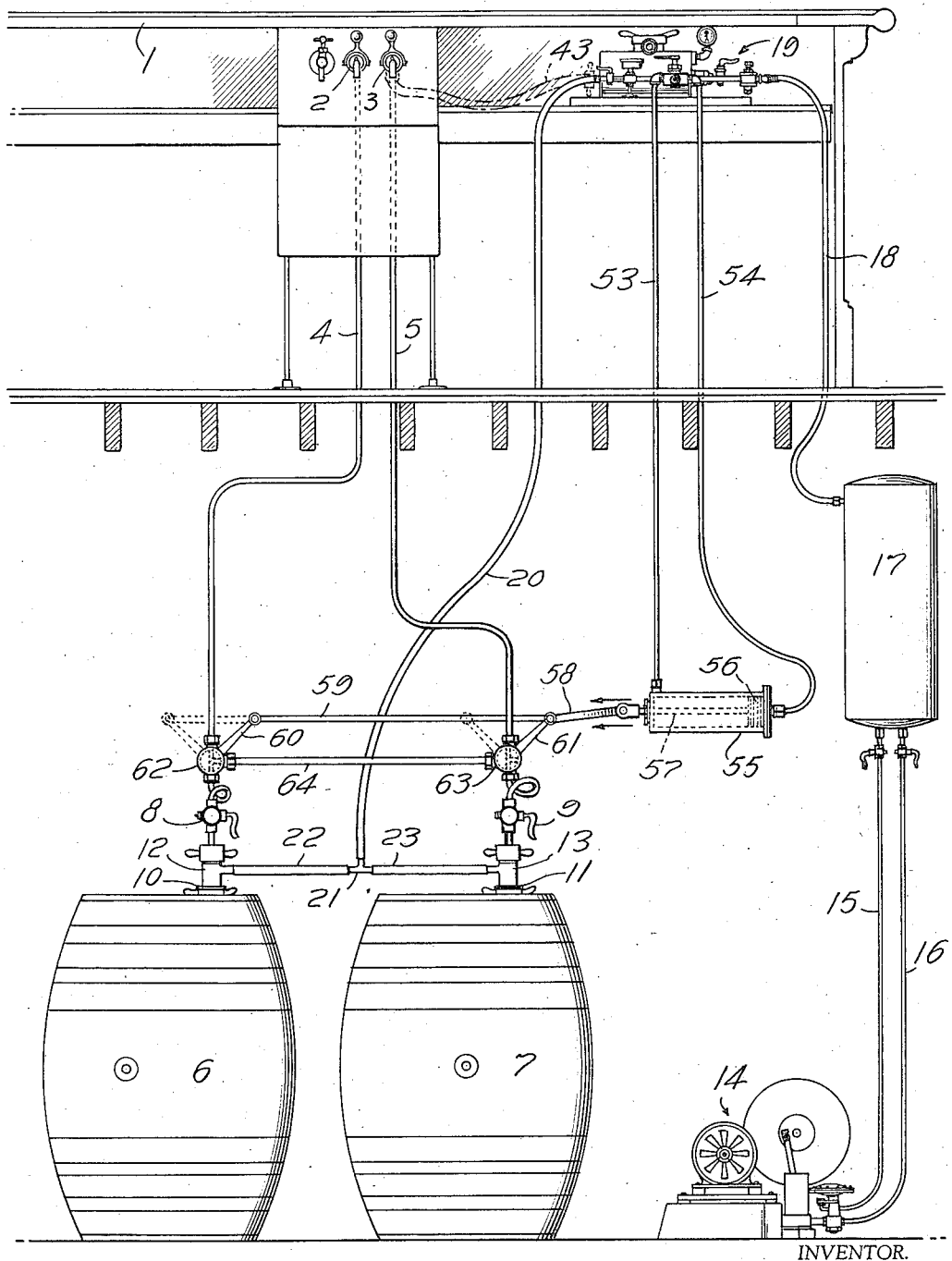

In the embodiment shown in Fig. 1 there is provided a bar 1, having a pair of faucets 2 and 3 for dispensing beverages, connected to pipes 4 and 5 respectively. Said pipes extend to near the bottom of barrels 6 and 7 and there are provided valves 8 and 9 for cutting off the flow of beverage when it is desired to remove and change barrels. This is accomplished by removing the wing nuts 10 and 11, which are a part of the bungs 12 and 13 of the system.

In order to produce the necessary pressure on the barrels to raise the beverage to the dispensing point, there is provided a pump 14, connected by pipes 15 and 16 to storage tank 17 for air. A pipe 18 leading from tank 17 is connected to the barrels at the bungs 12 and 13. Such an apparatus is old and well known and is commonly used.

In accordance with the present invention, there is interposed in the pipe 18 a device 19, shown in detail in Fig. 2. The airline 18 is secured to the inlet end of the device 19 and an exit pipe 29 therefrom allows air to flow through the T connection 21 and therefrom by pipes 22 and 23 to bungs 12 and 13 respectively.

With reference to Fig. 2, the pipe 18 is secured to nipple 25 which has secured thereto a T connection 26, having a pipe 27 extending therefrom and leading into pressure regulator 28. A pipe 29 therefrom has a pressure gage 30 connected thereto and a valve 31 is provided having a nipple 32 adapted to be connected with pipe 20. By means of this the dispenser at the bar is able to accurately and immediately control the pressure in the barrels by watching the pressure gage 30 and manipulating the regulator 28 to give the desired pressure and gas conditions.

A pipe 33 also extends from the T connection 26 and is provided with a valve 34 from which a connection is made to a small tank 35, mounted on the base 24. A pipe 36 which is a continuation of pipe 33 extends through tank 35 and the outer end thereof 37 extends into nipple 38. The top of tank 35 is provided with a dome 39 having a screen 40 at the bottom thereof and provided with a readily removable cover. A check valve 41 leads into the dome, the outer end of said check valve being adapted to be secured to a source of water or other liquid. It is also adapted to serve as a connection for gas pressure to force cleaning fluid from said tank. The dome 39 may be utilized to hold a cleaning material which is dissolved by water passing into the same through valve 41. By means of a wing nut 42, a flexible hole 43 may be attached to nipple 38. The outer end of the hose is provided with a valve 44 and a gas flow meter 45, the opposite end of which is provided with an enlargement 46 suitably constructed so that it may be slipped over and held onto the end of faucets 2 or 3.

When it is desired to remove the beverage from the pipes 4 or 5, the hose 43 is secured to nipple 38 and device 46 is placed in position as shown in Fig. 3. Valve 34 is opened and valve 31 is closed. Then valve 44 is opened and air flows through hose 43, faucet 3 and pipe 5, forcing the beverage therein into barrel 7. By noting the reading on the meter 45 the operator closes valve 44 when the reading shows that a volume of air has flowed through the meter equal to the volume of pipe 5. If desired, the meter 45 may be so designed that upon the flowing through of a predetermined volume of gas, it may automatically close valve 44 or its equivalent.

The tank 35 is provided with an elbow nipple 47 to which is secured a pressure gage 48. The tank 35 may be utilized as a means for measuring the amount of gas which is forced through the pipes 4 and 5. When so used, the meter 45 is unnecessary. In this operation valve 34 is opened and valve 31 is closed as before. The volume of the tank 35 is equal to the volume of the pipes 4 or 5. When the pressure as shown by pressure gage 48 has reached the desired point, valve 34 is closed and valve 44 is opened. This allows the compressed gas from the tank 35 to pass through pipe 43, faucet 3 and then to enter pipe 4 or 5 and force the beverage back into the barrel. It is, of course, essential that the pressure in pipe 43 be greater than the pressure in the barrels and this may be regulated by proper operation of the device 19.

A T connection 50 is provided between regulator 28 and pipe 29 and enters into a control valve 51 operated by handle 52. Pipes 53 and 54 from valve 51 are connected to opposite ends of cylinder 55 having a piston 56 operating therein. A piston rod 57 is joined by a link 58 to connecting rod 59 to which are secured the operating handles 60 and 61 of valves 62 and 63 secured in the respective pipes 4 and 5. A pipe 64 inter-connects valves 62 and 63.

Within the control valve 51 is a rotating valve member 65 having passages 66 and 67 as shown in Fig. 4 for connecting the airline 29 alternately to pipes 53 and 54. A vent opening 68 is provided in the valve casing.

When it is desired to clean the pipes 4 and 5, the operator manipulates handle 52 pushing it to the position shown in Fig. 2, whereby the connections are as shown in Fig. 4. Air passes through pipe 29 and through passage 66, pipe 54 and into cylinder 55, forcing the piston 56 to the left and air from the cylinder is forced through pipe 53, passage 67 and vent 68. The movement of the piston causes movement of valves 62 and 63, cutting off the flow of beverage and interconnecting pipes 4 and 5 through interconnecting pipe 64. Flexible hose 43 may be connected to either of the faucets as faucet 3 and a water connection under pressure attached to the opening to check valve 41. If desired, cleaning compounds may be inserted in dome 39. Upon the opening of valve 44 liquid flows through tank 35, hose 43, faucet 3, pipe 5, valve 63, connection 64, valve 62, pipe 4, and out through the faucet 2. Thereby the pipes may be thoroughly and quickly cleaned with very little effort either by water or cleaning solutions or both.

It is often desirable in order to obtain a better cleaning action to introduce air into the cleaning solution in order to cause it to flow more rapidly through the pipe system. In such case, valve 34 is opened causing air under pressure to flow through end 37 of pipe 36 and acting as an ejector, the air mixing with the solution and causing more rapid and effective movement thereof.

While I have described my invention setting forth a specific embodiment thereof, it is apparent that various changes may be made in the construction and in the manipulation of my device within the spirit of my invention. For example, the device 19 need not be placed in proximity to the faucets but may be placed at a considerable distance away and a few flexible connections will accomplish the desired results. It is not necessary to have pressure gages and valves and other parts of the type of construction here shown. It will be apparent to those skilled in the art that the various elements of my device may be differently located and differently constructed and the operation thereof may be modified within the scope of this invention.

While I have described but a single pipe 29 and have applied the device to but two barrels, it will be understood that two or more such pipes may be inserted into the device in order to enable one to operate on a larger number of barrels, supplying equal pressure to all lines. Such connections may also act as checks to enable the operator to cut off one or more barrels from the air pressure without leaving the bar. The piston rod 57 may be connected by rod 59 or otherwise to any desired number of barrels and it will serve to operate the cut off valves, as 62 or the like, simultaneously. I may provide a signal, such as a bulb which lights or a bell which rings, to indicate when the valves 62 and 63 are in the cut off position, to indicate that the system is now set for the cleaning operation.

My invention is, therefore, to be broadly construed and not to be limited except by the claims appended hereto.

What I claim is:—

1. In an apparatus of the type described, a control device constituting a unit separate from said apparatus and comprising an inlet pipe for gas under pressure, a pressure regulator connected thereto, a branch pipe from said regulator to a beverage container, another branch pipe from said inlet, a tank, said other branch being connected to said tank, the latter communicating with the discharge opening of a beverage faucet, and means associated with said tank for forcing cleaning fluid therethrough under pressure, said means including a connection for allowing the flow of fluid into the top portion of said tank, whereby a mixture of fluid and gas are forced through the system.

2. In an apparatus of the class described, a beverage dispensing system comprising a plurality of beverage containers, a source of gas pressure for the same and conduits from said containers to a plurality of faucets, the improvement which includes a control unit having a base, a connection from said pressure source to said unit, branch pipes on said unit from said connection, one of said pipes having a pressure regulator and communicating with said containers, the other of said pipes having means for communicating with said faucets including a meter for measuring a predetermined amount of gas and means for stopping the flow of gas when the desired amount has entered the system.

3. In an apparatus of the class described, a beverage dispensing system comprising a plurality of beverage containers, a source of gas pressure for the same and conduits from said containers to a plurality of faucets, the improvement which includes a control unit having a base, a connection from said pressure source to said unit, branch pipes on said unit from said connection, one of said pipes having a pressure regulator and communicating with said containers, the other of said pipes having means for communicating with said faucets including a tank capable of holding a predetermined volume of gas, whereby upon the opening of said faucets by the operator gas flows from said tank into the system in sufficient amounts to force beverage back to said containers and valve means for filling said tank with gas.

4. In an apparatus of the class described, a beverage dispensing system comprising a plurality of beverage containers, a source of gas pressure for the same and conduits from said containers to a plurality of faucets, the improvement which includes a control unit having a base, a connection from said pressure source to said unit, branch pipes on said unit from said connection, one of said pipes having a pressure regulator and communicating with said containers, the other of said pipes having means for communicating with said faucets, a tube interconnecting said conduits in proximity to said containers, valves at the intersection of said tube and conduits, said valves in one position allowing flow of beverage from said containers to said faucets and in the other position cutting off said flow and interconnecting said conduits, and means on said unit for operating said valves.

5. In an apparatus of the class described, a beverage dispensing system comprising a plurality of beverage containers, a source of gas pressure for the same and conduits from said containers to a plurality of faucets, the improvement which includes a control unit having a base, a connection from said pressure source to said unit, branch pipes on said unit from said connection, one of said pipes having a pressure regulator and communicating with said containers, the other of said pipes having means for communicating with said faucets, a tube interconnecting said conduits in proximity to said containers, valves at the intersection of said tube and conduits, said valves in one position allowing flow of beverage from said containers to said faucets and in the other position cutting off said flow and interconnecting said conduits, and means on said unit for operating said valves including a control valve connected to said pressure source, a cylinder, an operating piston therein connected to said valves, and gas pipes between said cylinder and control valve.

6. In an apparatus of the class described, a beverage dispensing system comprising a plurality of beverage containers, a source of gas pressure for the same and conduits from said containers to a plurality of faucets, the improvement which includes a control unit having a base, a connection from said pressure source to said unit, branch pipes on said unit from said connection, one of said pipes having a pressure regulator and communicating with said containers, the other of said pipes having means for communicating with said faucets including a tank, a connection on said tank for the introduction of cleaning fluid, and an ejector in said tank adapted to be operated by said gas pressure for forcing cleaning liquid through said tank and said system.

LOUIS JASPER.